United States Patent
Kruedener (10) Patent No.: US 9,890,574 B2
(45) Date of Patent: Feb. 13, 2018

(54) DEVICE FOR INFLUENCING THE MOVEMENT OF A FURNITURE PART, AND A FURNITURE PART

(71) Applicant: GRASS GMBH & CO. KG, Reinheim (DE)

(72) Inventor: Boris Kruedener, Darmstadt (DE)

(73) Assignee: Grass GmbH & Co. KG, Reinheim (DE)

( * ) Notice: Subject to any disclaimer, the term of this patent is extended or adjusted under 35 U.S.C. 154(b) by 0 days.

(21) Appl. No.: 15/278,142

(22) Filed: Sep. 28, 2016

(65) Prior Publication Data

US 2017/0037669 A1    Feb. 9, 2017

Related U.S. Application Data

(63) Continuation of application No. PCT/EP2015/052032, filed on Feb. 2, 2015.

(30) Foreign Application Priority Data

Mar. 31, 2014    (DE) .................... 20 2014 101 504 U (51) Int. Cl.
*E05F 5/02*    (2006.01)
*E05F 1/08*    (2006.01)
(Continued)

(52) U.S. Cl.
CPC .............. *E05F 5/006* (2013.01); *E05D 3/142* (2013.01); *E05F 5/08* (2013.01); *F16F 9/10* (2013.01);
(Continued)

(58) Field of Classification Search
CPC ..... E05F 5/00; E05F 5/02; E05F 5/022; E05F 5/003; E05F 5/06; E05F 5/006;
(Continued)

(56) References Cited

U.S. PATENT DOCUMENTS 1,329,313 A * 1/1920 Seabury .................. E05F 5/025
16/85
1,978,249 A * 10/1934 Decarie ..................... E05F 5/02
152/DIG. 11
(Continued)

FOREIGN PATENT DOCUMENTS

DE            2 313 053 A1    9/1974
DE    20 2008 006 755 U1    11/2009
(Continued)

OTHER PUBLICATIONS

English translation of International Preliminary Report on Patentability (Application No. PCT/EP2015/052032) dated Oct. 13, 2016.
(Continued)

*Primary Examiner* — Chuck Mah
(74) *Attorney, Agent, or Firm* — Burr & Brown, PLLC (57) ABSTRACT

A device for influencing the movement of a first furniture part relative to a second furniture part of a piece of furniture, having a damper for damping the relative movement between the first and the second furniture parts. The damper is made up of a single damping component that includes a container with a housing in which is accommodated a damping fluid which is enclosed by the housing, wherein a portion of the housing is formed from an elastically deformable material.

13 Claims, 4 Drawing Sheets

(51) Int. Cl.
| | |
|---|---|
| *E05F 5/00* | (2017.01) |
| *F16F 9/10* | (2006.01) |
| *E05D 3/14* | (2006.01) |
| *E05F 5/08* | (2006.01) |
| *F16F 13/10* | (2006.01) |
| *F16F 15/02* | (2006.01) |
| *A47B 95/04* | (2006.01) |

(52) U.S. Cl.
CPC ............ *F16F 13/10* (2013.01); *F16F 15/022* (2013.01); *A47B 95/043* (2013.01); *E05Y 2800/344* (2013.01); *E05Y 2900/20* (2013.01); *F16F 2224/041* (2013.01)

(58) Field of Classification Search
CPC .... E05F 5/08; E05F 5/10; E05D 3/142; E05Y 2201/24; E05Y 2201/212; E05Y 2800/344; E05Y 2900/20; A47B 2210/0018; A47B 95/043; B65G 69/001; F16F 9/10; F16F 9/103; F16F 13/10; F16F 2224/041; F16F 2224/04; Y10T 16/61; Y10T 16/62; Y10T 16/625; Y10T 16/628; Y10T 16/6285; Y10T 16/629
See application file for complete search history.

(56) References Cited

U.S. PATENT DOCUMENTS

| | | | | |
|---|---|---|---|---|
| 2,225,067 | A * | 12/1940 | Marin | E05F 5/02 16/86 A |
| 2,480,701 | A * | 8/1949 | Bradbury | E05B 17/005 16/86 A |
| 3,824,649 | A * | 7/1974 | Kempf | E05F 5/06 16/86 A |
| 4,351,868 | A * | 9/1982 | Otani | B32B 7/06 16/86 A |
| 5,269,043 | A * | 12/1993 | Yang | E05F 5/006 16/68 |
| 2004/0148734 | A1* | 8/2004 | Chiu | E05C 17/56 16/82 |
| 2005/0015927 | A1* | 1/2005 | Kropf | E05D 3/142 16/286 |
| 2009/0115116 | A1* | 5/2009 | Siemer | E05F 5/022 267/140.12 |
| 2009/0286910 | A1* | 11/2009 | Bloomfield | C08L 21/00 524/269 |
| 2010/0038196 | A1 | 2/2010 | Krammer | |
| 2011/0005032 | A1* | 1/2011 | Domenig | E05F 5/006 16/54 |
| 2012/0174338 | A1* | 7/2012 | Wu | E05F 5/006 16/297 |
| 2013/0113355 | A1* | 5/2013 | Salice | E05F 5/006 312/326 |
| 2014/0352111 | A1* | 12/2014 | Ng | E05F 5/02 16/286 |
| 2016/0120310 | A1 | 5/2016 | Kruedener | |

FOREIGN PATENT DOCUMENTS

| | | | |
|---|---|---|---|
| DE | 20 2011 002 708 U1 | 6/2011 | |
| EP | 1 481 611 A1 | 12/2004 | |
| EP | 1 852 870 A1 | 11/2007 | |
| GB | 2491135 A * | 11/2012 | ............... E05F 5/02 |
| WO | 2008/083417 A1 | 7/2008 | |
| WO | 2012/072206 A1 | 6/2012 | |
| WO | 2015/007492 A1 | 1/2015 | |

OTHER PUBLICATIONS

German Search Report (Application No. 20 2014 101 504.3) dated Apr. 9, 2014.
International Search Report and Written Opinion (Application No. PCT/EP2015/052032) dated Jun. 5, 2015.

* cited by examiner

DEVICE FOR INFLUENCING THE MOVEMENT OF A FURNITURE PART, AND A FURNITURE PART

CROSS REFERENCE TO RELATED APPLICATIONS

This application is a continuation of International Application No. PCT/EP2015/052032 filed Feb. 2, 2015, which designated the United States, and claims the benefit under 35 USC §119(a)-(d) of German Application No. 20 2014 101 504.3 filed Mar. 31, 2014, the entireties of which are incorporated herein by reference.

FIELD OF THE INVENTION

The present invention relates to a device for influencing the movement of a furniture part and a furniture part.

BACKGROUND OF THE INVENTION

Devices which are intended for influencing a movement of a furniture part by damping or braking the movement of the furniture part are known. Use is made here of damping means for damping the relative movement between the furniture parts, whereby the intention is to avoid undesired slamming or impact sounds and shock-like loading when a furniture part is being closed. In pieces of furniture, for the movable guidance of a furniture part, use is made, for example, of single-extension or full-extension mechanisms having telescopically displaceable rails for linear furniture-part movement, for example, of drawers, or hinge arrangements are provided for a pivoting movement of a furniture part such as a door or a shutter.

SUMMARY OF THE INVENTION

It is an object of the present invention to provide a device and a piece of furniture of the type mentioned in the introduction in the case of which it is advantageously possible to influence the movement between the furniture parts to provide a damping action. In particular, the intention is to provide a device which is of as straightforward a design as possible and has its functioning adapted to the particular situation.

The present invention proceeds, in the first instance, from a device for influencing the movement of a first furniture part of a piece of furniture, it being possible for the first furniture part to be moved relative to a second furniture part of the piece of furniture, having damping means for damping the relative movement between the first and the second furniture parts. The present invention relates, in particular, to a furniture-part-damping device.

The present invention has at its core the fact that the damping means are made up of a single damping component, which comprises a container with a housing in which is accommodated a damping fluid which is enclosed by the housing, wherein a portion of the housing is formed from an elastically deformable material. The elastically active housing portion serves for triggering the damping action in that, for a damping operation, the elastic housing portion is subjected to a force which can be attributed to a relative movement of the furniture parts which can be moved in relation to one another. The compressive force acting on the elastic housing portion from the outside results in the elastic housing portion yielding elastically and thus in the housing of the container changing shape. This, in turn, is associated with a flow movement of the damping medium enclosed in the container, since the damping fluid, if it is a liquid, is not compressible, adapts itself to the changed shape of the housing. The container is advantageously filled, in particular, at least more or less completely with the damping fluid. In dependence on the type of damping fluid, the flow movement of the damping fluid, or the viscosity of the damping fluid, gives rise to a resistance in relation to the deformation of the elastic housing portion or in relation to the force acting on the elastic housing portion from the outside, whereby the relative movement of the relevant furniture parts, or of the relevant furniture part, is damped.

The elastic housing portion is sealed, in particular, in relation to through-passage of the damping fluid and comprises, for example, a thin film-like or membrane-like wall, for example, a rubber skin or plastic skin possibly with a reinforcing material, for example, a woven fabric, embedded therein.

The damping means according to the invention are advantageously straightforward to produce and of compact construction. The damping means are formed, in particular, exclusively by the damping component itself.

It is advantageous here that, in comparison with an arrangement of furniture parts without any damping means, all that is required in order to establish the damping action is for the damping component to be provided at a suitable location of a furniture part. The damping action can be realized at any time advantageously in a flexible manner or optionally without any further, or other, measures being required on the finished furniture part, or completely assembled and functionally ready piece of furniture, in particular, also in retrospect.

Accordingly, the damping component can be attached at any suitable location, wherein the location is distinguished, in particular, by parts moving toward one another and away from one another and, in dependence on the movement of the furniture part which is to be damped, prior to a closed position or open position of the furniture part being reached.

Such locations are to be found, for example, on front portions of a basic furniture structure, against which the furniture part which is to be damped would strike, or toward which the furniture part would move, in order to reach the closed state. Suitable locations for the attachment of the damping component are also regularly present in the region of the guide means, such as a single-extension or full-extension mechanism or a hinge arrangement.

Desired damping characteristics of the damping component can be set or predetermined via the geometry of the housing and/or by the properties of the damping fluid.

The damping fluid is advantageously a dilatant medium. The dilatant medium is, in particular, a dilatant fluid or a dilatant liquid, e.g. a starch pulp or a silicone-based kneading material also known as "silly putty". The dilatant medium is a non-Newtonian fluid and is distinguished by a higher viscosity being observable as the shear stress or the changes in shearing greatly over time. A dilatant medium may also be referred to as being shear thickening or shear hardening.

The increase in viscosity is caused by a change in structure in the fluid, which ensures that, at a relatively high shear rate, the individual fluid particles interact with one another, for example, interlock, to a more pronounced extent and thus are less likely to slide past one another.

The viscosity of a dilatant medium increases with the shear rate and, in the event of a constant shear rate, is not dependent on time.

If the shear stress $\tau$ is given as a function of the shear rate $$\frac{du}{dy},$$

then liquids with dilatency are characterized typically by a flow law conforming to $$\tau = K\left(\frac{du}{dy}\right)^n$$

and the flow index n>1.

The dilatant medium advantageously realizes intelligent damping characteristics. In the case of the furniture part which is to be damped closing quickly, the damping action provided is greater, or—in accordance with the dilatency of the damping fluid—at a maximum, in comparison with a slower-closing furniture part, which gives rise to a lower shear rate of the dilatant medium in the housing. This is because the lower viscosity of the dilatant medium here means that the furniture part will reach its closed position without significant deceleration or more or less without any further braking. This is advantageous since the low closing speed also precludes the need for any significant damping, as a result of which the furniture part can assume its closed position as soon as possible advantageously without being obstructed by any relevant damping action of the damping component. In the case of a high closing speed of the furniture part, in contrast, the dilatant medium acts as though it would thicken or harden, and this gives rise to a greater damping action, which is likewise advantageous.

It is also advantageous that the entire housing of the container consists of an elastic material. The entire housing is advantageously formed from an, in particular, continuous or single-piece elastic material, for example, in the manner of a hollow rubber ball which has its interior filled with damping fluid or dilatant fluid.

As an alternative, the housing of the container advantageously has a housing portion made of an at least essentially rigid material. The housing thus comprises a housing portion made of an elastically deformable material and a housing portion made of a rigid or stiff material. The rigid housing portion makes it possible for the damping component to be attached, for example, in an easier or improved manner at an attachment location of the piece of furniture or of the guide unit.

It is further advantageous to provide attachment means, by which the damping component can be attached to a furniture part. In particular, the damping component can be adhesively bonded to an attachment location by adhesive-bonding means.

It is further advantageous to provide restoring means for restoring the portion of the housing made of an elastically deformable material into a starting shape. The starting shape is that shape which the elastic portion of the housing assumes in the state in which it is not subjected to loading from the outside or without pressure-exerting contact by a mating portion in the closed state of the furniture part which is to be damped as it is being closed.

The restoring means advantageously comprise a spring arrangement. The spring arrangement provides a spring force, for example, by way of a prestressed helical spring, and therefore the spring force can restore the elastic housing portion to a starting shape when there is no other, higher opposing force acting on the elastic housing portion from the outside. This is the case, in particular, in the open state of the furniture part or when the damping means are not functioning or there is no mating portion exerting pressure on the elastic housing portion from the outside, as is the case, in contrast, in a damping situation. It is also the case that the spring means remain ineffective as long as the furniture part remains closed on the furniture part and the elastic housing portion remains pushed in.

The restoring means may also be provided by the elastic behavior of the elastic housing portion.

An advantageous modification of the subject matter of the present invention is characterized in that at least one region of the housing portion is formed from an elastically deformable material with a projecting, in particular, convex, exterior shape. The essential factor here is that the convexity can provide for an outwardly projecting shape of the housing. The outwardly curved exterior shape of the housing of the container can be understood as being a starting shape or an exterior shape of the elastic housing portion when the part which is to be damped or braked is not in pressure-exerting contact from the outside. The convex housing portion may be formed, for example, with a uniform progression or, for example, in an undulating manner, or with some other contour, over the entire outer surface of the elastic housing portion. The convex housing portion may correspond, in particular, to part of a sphere, e.g. it may be hemispherical or something approximating this, for example, in the manner of a liquid droplet which is lying on a surface and, on account of surface phenomena, does not disperse. The curved or projecting shape can reliably establish contact of the elastic housing portion with a mating portion during a damping operation, and therefore the deformation of the elastic housing portion results in a flow movement of the damping fluid, which is promoted by the projecting or convex outer shape of the housing becoming flatter.

The present invention also relates to a device for guiding the movement of a first furniture part relative to a second furniture part of a piece of furniture, comprising a hinge arrangement having a hinge cup and a hinge part and a hinge lever, which acts between the hinge cup and the hinge part and is articulated on the hinge cup and on the hinge part, wherein the hinge cup can be attached to one furniture part and the hinge part can be attached to the other furniture part, and therefore, when the furniture parts are moved relative to one another, the hinge lever can be pivoted relative to the hinge cup about a hinge pin of the hinge arrangement. In particular, two identically acting, in particular, two identical, hinge levers are present between the hinge cup and the hinge part.

The significant aspect of the movement-guiding device is that the hinge arrangement has a device as mentioned above, and therefore the relative movement between the first and the second furniture parts is damped in dependence on a pivoting movement of the hinge lever. The hinge lever acts between the hinge cup and the hinge part and is articulated on the hinge cup and the hinge part, in particular, at the end in each case. During the relative movement of the furniture parts, the hinge lever executes a pivoting movement about a hinge pin which belongs to a pivot joint on the hinge cup. Accordingly, the hinge lever changes its position or orientation relative to portions of the hinge arrangement and/or to the hinge part and to the hinge cup. The invention makes use of this relationship, the device with the damping component being placed at a suitable location of the hinge arrangement, and therefore interaction, in particular, of the hinge lever with the damping component results in damping as the furniture part is being closed.

It is advantageous that the damping component is arranged in the region of the hinge cup. When the furniture part which can be moved by the hinge arrangement reaches a closed state, the hinge lever reaches an end position on the hinge cup. It is thus possible for the damping component to be positioned in a manner coordinated with the position of the hinge lever, and therefore, before the furniture part which can be pivoted by the hinge reaches its closed position, the hinge lever comes into pressure-exerting contact against the elastic housing portion of the damping component, which is fastened on the hinge cup. As a result, the elastic housing portion of the damping component is deformed and movement of the furniture part is damped, on account of the correspondingly high shear rate of the dilatant medium or damping medium enclosed in the container of the damping component.

In particular, it is advantageous if the damping component is attached in a recessed region of the hinge cup, for example, to a floor of the hinge cup or hinge-cup walls projecting at an angle to the floor. This is because, here, the damping component is clamped in by the hinge lever in a particularly advantageous manner and the elastic housing portion of the damping component is therefore deformed. Furthermore, the damping component set back in the hinge cup is less obvious or obtrusive.

The damping component is preferably positioned in a central recessed region of the hinge cup. There, the floor of the hinge cup provides a free and planar surface for the advantageous attachment of the damping component.

Furthermore, it is advantageous that a plurality of damping components are provided in the recessed region of the hinge cup. In particular, two damping components are present at opposite locations of the hinge cup or of the recess of the hinge cup. This is advantageous to the extent where there are usually two hinge levers present in hinge arrangements in furniture, and therefore each hinge lever can be assigned a damping component.

The present invention also concerns a piece of furniture having a first furniture part which can be moved relative to a second furniture part of the piece of furniture. A device according to one of the aforementioned embodiments is provided according to the present invention. In particular, this is advantageous for a piece of furniture having a door or shutter which is accommodated on a basic structure of the piece of furniture such that it can be pivoted by a hinge arrangement as explained above.

As an alternative, or in addition, it is possible for the piece of furniture to have provided on it a device according to the invention having a damping component which is positioned on one side of a furniture part or of a movable furniture part or of a basic structure of the piece of furniture. The damping component is present, in particular, for example, on a front narrow end side of a basic-structure side wall or at a location of an inner side of the movable furniture part, for example, of a furniture door, which, in the closed state of the movable furniture part, is located opposite to the front narrow end side of the basic-structure side wall. This means that, prior to the closed state being reached, the elastic housing portion of the damping component, the housing portion being present in a projecting state, deforms, which occurs by virtue of the housing portion being clamped in between the end side of the basic-structure side wall and the inner side of the movable furniture part, this making it possible to achieve the damping action, at least when the furniture part is closed comparatively quickly.

It is particularly advantageous that the damping component is arranged in an at least partially set-back state within a region which is recessed in relation to a planar outer side of the first or second furniture part, wherein at least one part of the elastic housing portion projects beyond an opening of the recessed region.

The recessed region may be made beforehand, or if appropriate in retrospect, on the end side of the basic-structure side wall or the inner side of the movable furniture part, for example, by way of a blind hole formed by a bore.

The damping component may be, for example, adhesively bonded into the recess, wherein the elastic housing portion projects beyond the periphery of the blind hole.

It is thus possible, when the furniture part is being closed relative to the basic furniture structure, for the elastic housing portion to come into contact with the other furniture part, wherein the damping medium executes a flow movement and damping thus takes place.

BRIEF DESCRIPTION OF THE DRAWINGS

Further features and advantages of the present invention will be explained in more detail with reference to various, highly schematically illustrated exemplary embodiments.

DETAILED DESCRIPTION OF THE INVENTION

Figure 1:
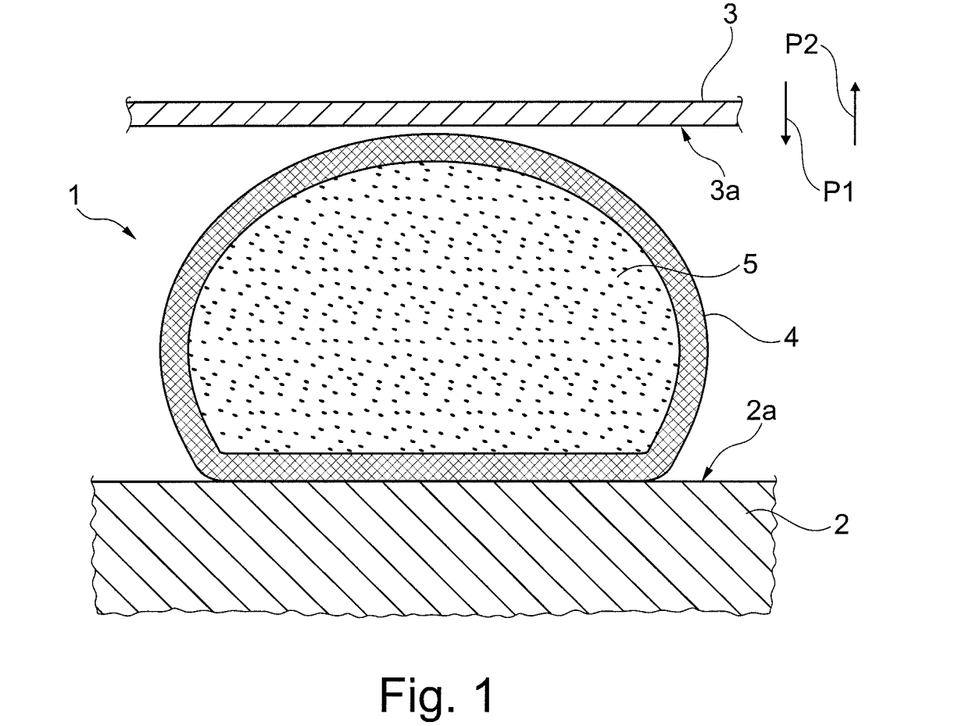
FIGS. 1 and 2 show a sectional view through a device according to the present invention in the state in which it is attached to a piece of furniture, which is shown in part, two different operating states being depicted.

FIG. 1 shows, on a vastly enlarged scale, a furniture-part-damping device according to the invention, designed in the form of a door buffer 1, on a piece of furniture, which is illustrated in part. The door buffer 1 is fixed, for example, adhesively bonded, to a planar outer side 2a of a front end side of a wall 2 of a basic structure of the piece of furniture. A pivotable door 3, likewise illustrated only with a front part, is also attached to the piece of furniture. The door 3 can be pivoted on the basic furniture structure, via, for example, two hinge arrangements, in a closing direction in accordance with the arrow P1 and in an opposite, opening direction in accordance with arrow P2. The door buffer 1 is provided for the purpose of damping or for braking the closing movement of the door 3 over the final movement section prior to a closed position of the door 3 relative to the wall 2 being reached.

The door buffer 1 comprises a housing 4 which consists entirely, or in one piece, of a comparatively thin, elastically deformable material such as, for example, a rubber material. The housing 4 encloses in a sealed manner an inner volume of the door buffer 1, the volume being completely filled with a dilatant fluid or a dilatant medium 5. The dilatant medium 5 constitutes an intelligent damping fluid. By virtue of the housing 4 being subjected to a force from the outside, the associated portion of the housing 4 deforms, and therefore the change in shape of the housing 5 inevitably causes the dilatant medium 5 to execute a flow movement, which results in shearing of the dilatant medium 5 and therefore, in the case of the relatively high level of shearing, in an increase in viscosity.

The door buffer 1 is attached to the end side of the wall 2 at a location which, in the state in which the door 3 is closed or pivoted onto the basic structure, is located opposite to a location on an inner side 3a of the door 3.

FIG. 1 shows a starting situation with the door buffer 1 attached and not subjected to loading from the outside and without any contact with the inner side 3a of the door 3. According to FIG. 1, the door 3 pivots toward the door buffer 1 in direction P1, wherein, just prior to a closed position of the door 3 being reached, the door 3 is located on the piece of furniture and the inner side 3a is spaced apart slightly from the door buffer 1.

Just prior to the closed state of the door 3 on the piece of furniture being reached, the inner side 3a comes into contact with the door buffer 1.

Figure 2:
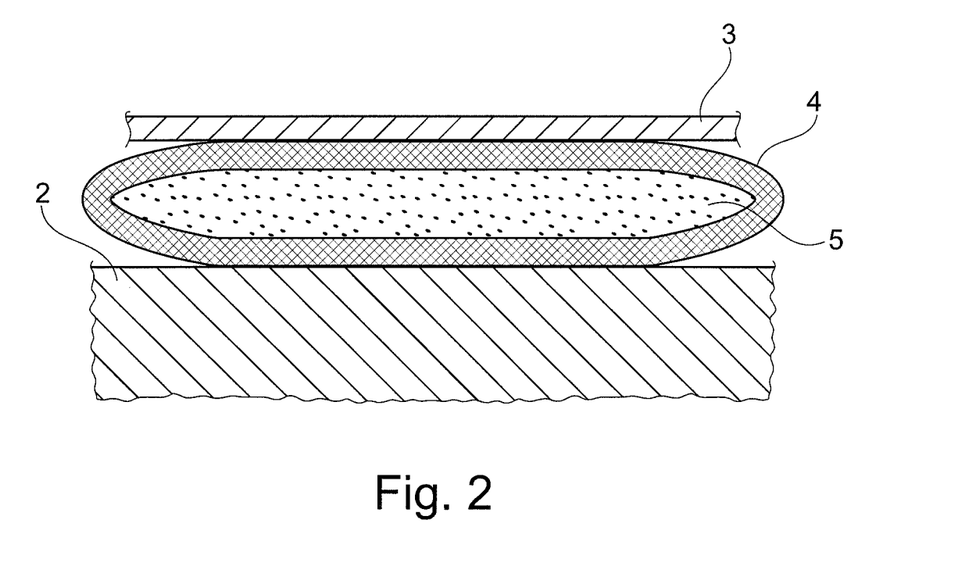

FIG. 2 shows the closed state of the door 3 on the piece of furniture, or the door 3 being in the resting state relative to the wall 2. The door buffer 1 has changed in shape here by virtue of the inner side 3a of the door 3 pressing against the elastic housing 4 of the door buffer 1.

Depending on this speed of the door 3 coming into contact with the housing 4, flow movement or shearing of the dilatant medium 5 takes place as the housing 4 deforms. The damping action of the door buffer 1 is formed in dependence on the shear rate of the medium 5. In the case of an elevated shear rate of the dilatant medium, the dilatant medium 5 has a higher viscosity than in the case of a lower shear rate, when the door 3 closes, for example, more slowly and the housing 4 therefore deforms more slowly.

Depending on the specific scenario or on the viscosity of the dilatant medium, the closing movement of the door 3 in the final closing-movement region of the door 3 relative to the wall 2 in contact with the door buffer 1 is counteracted by an opposing force, and damping or braking of the door is thus achieved. This takes place during the continued closing movement of the door 3 in direction P1 between the states shown in FIGS. 1 and 2.

If the door 3 is opened again in direction P2 from the closed state, with the housing 4 pressed flat, according to FIG. 2, the inherent prestressing of the compressed housing 4 restores the housing 4 again from the compressed or flat shape into the starting shape shown according to FIG. 1, and therefore, during the next closing operation, it is possible for the door 3 to be damped anew as it is being closed, as described above.

Figure 3:
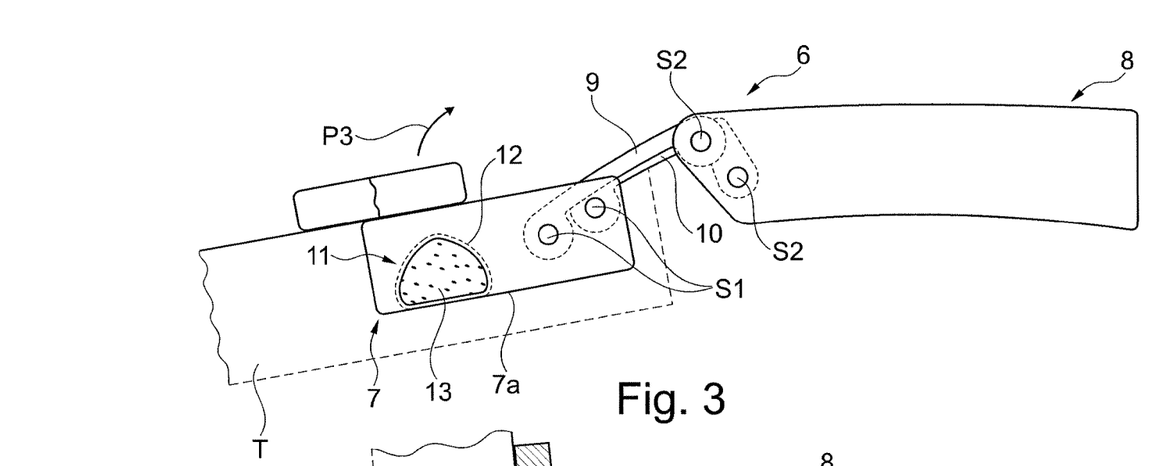
FIGS. 3 and 4 show a further device according to the present invention, this time having a hinge arrangement, as seen from the side and partly in section, two different operating states being depicted.
Figure 4:
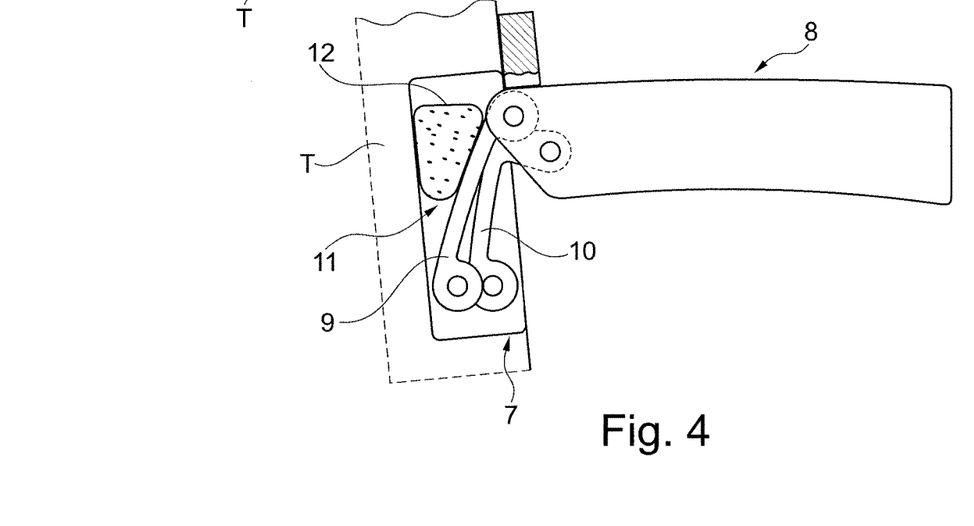

FIGS. 3 and 4 show a device according to the invention for guiding the movement of a first furniture part relative to a second furniture part of a piece of furniture, comprising a hinge arrangement 6 having a hinge cup 7 and a hinge part 8, wherein two identical hinge levers 9, 10 act between the hinge cup 7 and the hinge part 8. The hinge cup 7 here is attached to a first furniture part, for example, a door T, which is provided on a piece of furniture such that it can be pivoted via the hinge arrangement 6. The hinge part 8 can be attached to a basic structure of the piece of furniture or to the inner side of a side wall of the basic furniture structure. There are usually two or more hinge arrangements 6 acting to move the door, accommodated via the hinge arrangement 6, on the piece of furniture.

The hinge arrangement 6 has damping means which are formed by a single damping component 11. The starting shape of the damping component 11 is shown in FIG. 3, wherein the damping part 11 is accommodated centrally in a recessed region of the hinge cup 7, spaced apart somewhat from the first hinge pin S1 articulating the hinge levers 9, 10 on the hinge cup 7. The hinge levers 9, 10 are also fastened on the hinge part 8 in an articulated manner via a further, second hinge pin S2. The damping part 11 comprises a housing 12 made of an elastic material, for example, made of a plastic or rubber membrane, by way of which the housing 12 encloses a volume which is filled with a dilatant medium 13. In the starting position according to FIG. 3, the housing 12 projects upward in conical form from a floor 7a of the hinge cup 7. If then during a pivoting movement of the door T, which is indicated by dashed lines, it moves in accordance with arrow P3 in a closing direction, the hinge levers 9, 10 come simultaneously, and in the same way, into contact with the outer side of the housing 12 and compress the same, and therefore a flow movement of the dilatant medium 13 takes place and, as a result, the viscosity is increased and therefore the pivoting movement of the door T relative to the basic furniture structure is damped correspondingly.

If the door T is pivoted out of the position according to FIG. 4 again into the open position, the inherent elasticity of the housing 12 restores the exterior shape of the housing 12 according to FIG. 3.

Figure 5:
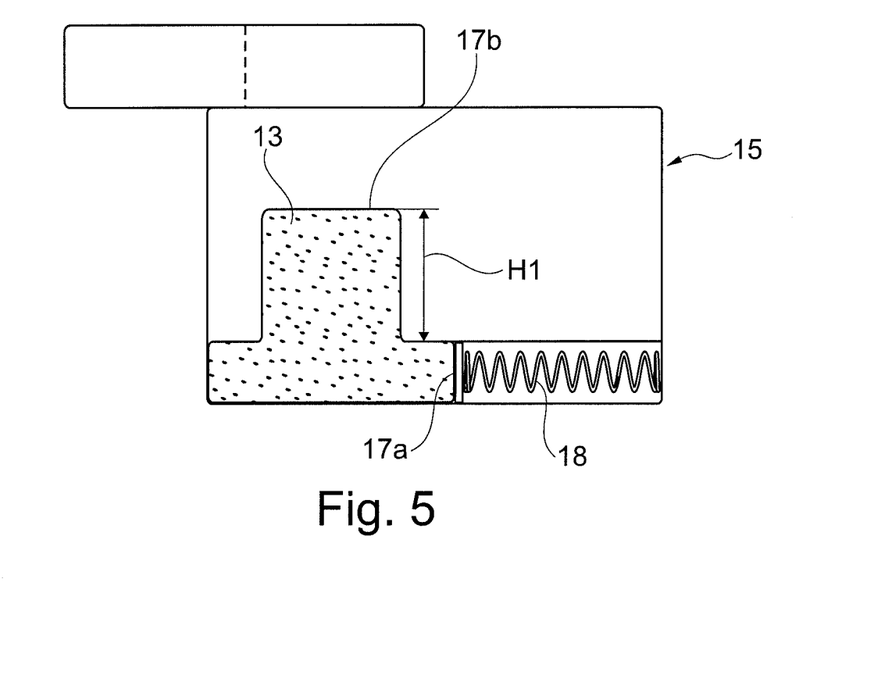
FIGS. 5 and 6 show a modification according to the present invention of a hinge cup of a device according to the present invention having a hinge arrangement as seen in side view and partly in section, two different operating states being depicted.
Figure 6:
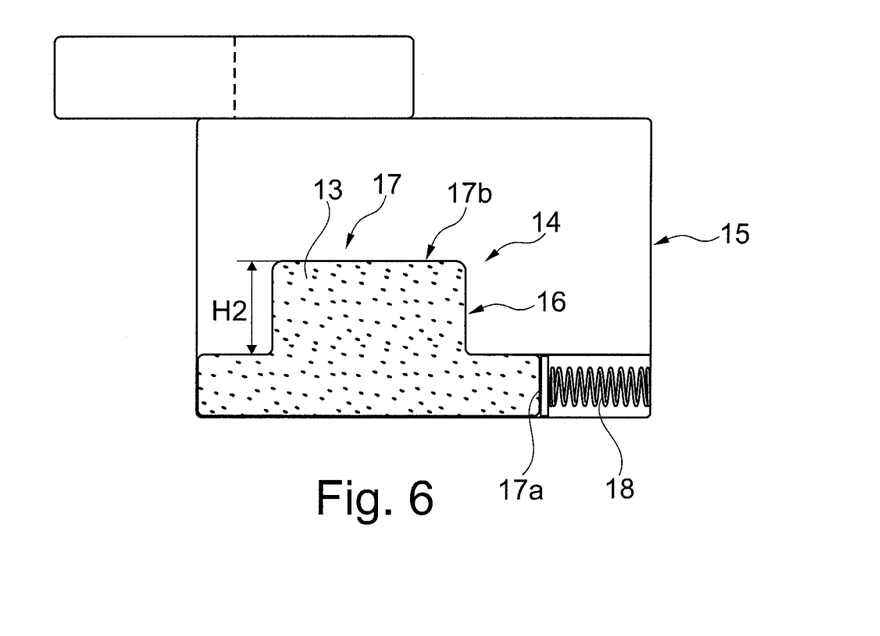

FIGS. 5 and 6 show an alternative arrangement to FIGS. 3 and 4, with a damping component 14 in a hinge cup 15 of a hinge arrangement (not shown in any more detail) with associated hinge levers and a hinge part. The damping component 14 has a housing 16 which is like an elastic sleeve 17 and in which a dilatant medium 13 is accommodated. In order to ensure that the elastic sleeve 17 can be reliably restored from the pressed-in or compressed shape according to FIG. 6, which is achieved at the end of a damping operation, into the starting position shown according to FIG. 5, the elastic sleeve 17 is designed to interact with a spring element 18 or a helical spring. Accordingly, FIG. 5 shows, in section, the starting position of the elastic sleeve 17 and the spring element 18, which acts on a portion 17a thereof, wherein the elastic sleeve 17 projects convexly upward with a height H1 which by the portion 17a of the elastic sleeve 17 being subjected to the pressure of the prestressed spring element 18.

If then, during a closing operation, the movement of the door, which can be moved by the hinge arrangement, is damped by virtue of the hinge levers coming into contact with a further (upwardly) projecting portion 17b of the elastic sleeve, the latter is compressed some way counter to the spring force of the spring element 18. The portion 17b here has the height H2, which is lower than the height H1. The spring or the spring element 18 is shortened or compressed to some extent here, which is depicted in FIG. 6.

If then a furniture part which is to be damped, or a door, is opened again by the hinge arrangement, the contact between the hinge levers and the portion 17b of the elastic sleeve is eliminated, and therefore the compressed spring element 18 presses onto the portion 17a such that the convex, elevated exterior shape of the housing 16 or of the elastic sleeve 17 according to FIG. 5 is achieved again.

The spring element 18 is coordinated such that, in the compressed state of the spring element 18, the pressure-exerting levers remain on the elastic sleeve 17 and the shape of the elastic sleeve 17 is unchanged.

Figure 7:
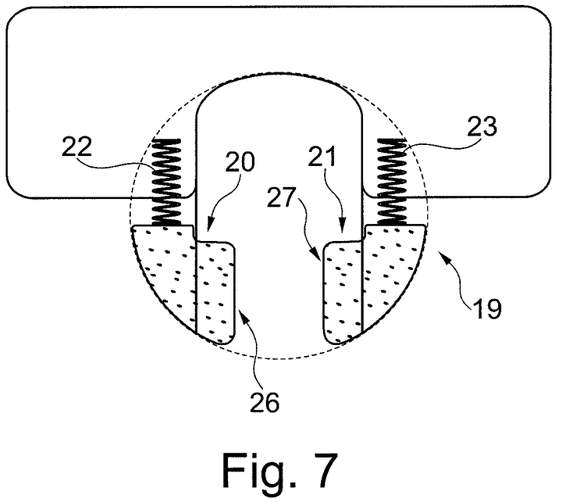
FIGS. 7 and 8 show, from above, a hinge cup of a device according to the present invention in a variant to the hinge cup according to FIGS. 5 and 6.
Figure 8:
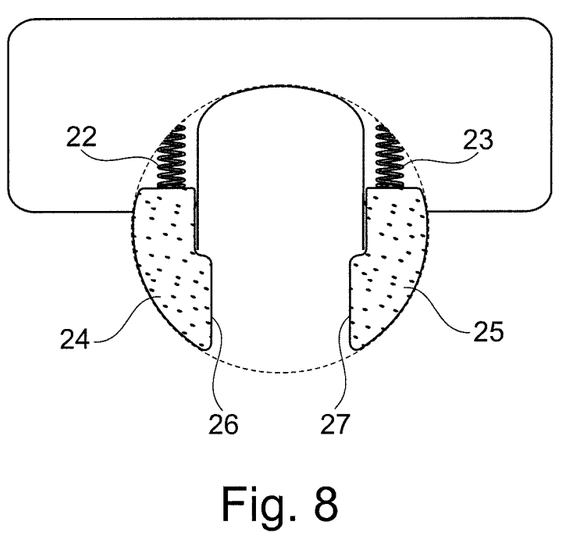

FIGS. 7 and 8 show an alternative embodiment of the arrangement according to the invention similar to that of FIGS. 5 and 6.

Instead of the damping component 14 arranged centrally in the recess of the hinge cup 15 according to FIGS. 5 and 6, identical damping components 20 and 21 having an elastic housing and accommodating a dilatant medium 13 are provided laterally in each case in a recessed region of a hinge cup 19. Each damping component 20, 21 is present on one side of the hinge cup 19 and can interact with a respective hinge lever (not illustrated) of the hinge arrangement. Accordingly, FIG. 7 shows the damping part 20 and 21 in the starting position with elastic housing portions 26 and 27 projecting laterally, wherein each damping part 20 and 21 has an associated spring element 22 and 23 provided for it. The respective spring element 22, 23 acts on a portion of a respective elastic sleeve 24, 25 of a housing of the damping parts 20, 21 in a manner equating to the function of the spring element 18 from FIGS. 5 and 6.

LIST OF REFERENCE SIGNS

1 Door buffer
2 Wall
2a Outer side
3 Door
3a Inner side
4 Housing
5 Medium
6 Hinge arrangement
7 Hinge cup
7a Floor
8 Hinge part
9 Hinge lever
10 Hinge lever
11 Damping component
12 Housing
13 Medium
14 Damping component
15 Hinge cup
16 Housing
17 Sleeve
17a Portion
17b Portion
18 Spring element
19 Hinge cup
20 Damping component
21 Damping component
22 Spring element
23 Spring element
24 Sleeve
25 Sleeve
26 Housing portion
27 Housing portion

The invention claimed is:

1. A device for influencing the movement of a first furniture part relative to a second furniture part of a piece of furniture, comprising a damper for damping the relative movement between the first and the second furniture parts, wherein the damper is made up of a single damping component that includes a container defining a housing enclosing a damping fluid, wherein a portion of the housing is formed from an elastically deformable material, the elastically deformable material having a substantially non-deformed starting shape, and a hinge arrangement, the hinge arrangement including a hinge cup attached to one of the first furniture part and the second furniture part, a hinge part attached to the other of the first furniture part and the second furniture part, first and second hinge levers fastened on the hinge cup via spaced apart first hinge pins, and fastened on the hinge part via spaced apart second hinge pins, the first and second hinge levers being configured to pivot relative to the hinge cup; wherein the single damping component is provided in a region proximate the hinge cup and proximate the first and second hinge levers, thereby resulting in damping as the one of the first furniture part and the second furniture part moves relative to the other of the first furniture part and the second furniture part.

2. The device as claimed in claim 1, wherein the damping fluid is a dilatant medium.

3. The device as claimed in claim 1, wherein the entire housing of the container consists of an elastic material.

4. The device as claimed in claim 1, wherein the housing of the container has a housing portion made of an at least essentially rigid material.

5. The device as claimed in claim 1, further comprising an attachment member provided on the damping component, adapted to attach the damping component to a portion of at least one of the first furniture part and the second furniture part.

6. The device as claimed in claim 1, further comprising a restoring member proximate the housing, positioned to restore the portion of the housing made of the elastically deformable material into the substantially non-deformed starting shape.

7. The device as claimed in claim 6, wherein the restoring member comprises a spring arrangement having at least a first end in contact with an inner wall of the hinge cup, and a second end positioned to apply pressure to a surface of the housing enclosing the damping fluid.

8. The device as claimed in claim 1, wherein at least one region of said portion of the housing is formed from the elastically deformable material with a projecting exterior shape.

9. The device as claimed in claim 8, wherein the projecting exterior shape is convex.

10. The device as claimed in claim 1, wherein the damping component is positioned in a central recessed region of the hinge cup.

11. The device as claimed in claim 10, wherein at least a restoring member and the housing of the damping component are provided in the central recessed region of the hinge cup.

12. A piece of furniture having at least a first furniture part comprising a device as claimed in claim 1.

13. The piece of furniture as claimed in claim 12, wherein the damping component is arranged in an at least partially set-back state within a recessed region which is recessed in relation to a planar outer side of the at least the first furniture part, wherein at least one part of the housing projects beyond an opening of the recessed region.

* * * * *